United States Patent
Mukherjee et al.

(10) Patent No.: US 9,537,732 B2
(45) Date of Patent: Jan. 3, 2017

(54) METHODS AND SYSTEMS FOR IMPROVING WEBSITE PERFORMANCE

(71) Applicant: Go Daddy Operating Company, LLC, Scottsdale, AZ (US)

(72) Inventors: Rajatish Mukherjee, Sunnyvale, CA (US); Rajinder Nijjer, Phoenix, AZ (US); Ketaki Rao, Sunnyvale, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 754 days.

(21) Appl. No.: 13/954,062

(22) Filed: Jul. 30, 2013

(65) Prior Publication Data

US 2015/0039746 A1    Feb. 5, 2015

(51) Int. Cl.
*G06F 15/173* (2006.01)
*H04L 12/24* (2006.01)

(52) U.S. Cl.
CPC ................. *H04L 41/5067* (2013.01)

(58) Field of Classification Search
CPC ....... H04L 12/26; H04L 41/5067; H04L 43/08
See application file for complete search history.

(56) References Cited

U.S. PATENT DOCUMENTS

| | | | |
|---|---|---|---|
| 5,944,790 A | 8/1999 | Levy | |
| 5,983,351 A | 11/1999 | Glogau | |
| 6,263,352 B1 | 7/2001 | Cohen | |
| 6,313,835 B1 | 11/2001 | Gever et al. | |
| 6,484,149 B1 | 11/2002 | Jammes et al. | |
| 6,601,057 B1 | 7/2003 | Underwood et al. | |
| 6,834,306 B1 | 12/2004 | Tsimelzon | |
| 6,854,088 B2 | 2/2005 | Massengale et al. | |
| 6,938,205 B1 | 8/2005 | Hanson et al. | |
| 7,062,492 B1 | 6/2006 | Graham | |
| 7,111,229 B2 | 9/2006 | Nicholas et al. | |
| 7,191,210 B2 | 3/2007 | Grossman | |
| 7,246,305 B2 | 7/2007 | Batres | |
| 7,475,425 B2 | 1/2009 | Bantz et al. | |
| 7,500,182 B2 | 3/2009 | Kelly | |
| 7,500,183 B2 | 3/2009 | Kelly | |
| 7,596,620 B1 | 9/2009 | Colton et al. | |
| 7,680,901 B2 | 3/2010 | Rechterman et al. | |
| 7,743,334 B2 | 6/2010 | Rider | |
| 7,788,130 B2 | 8/2010 | Feeley et al. | |
| 7,983,924 B2 | 7/2011 | Garrison | |
| 8,037,168 B2 | 10/2011 | Schneider | |
| 8,312,015 B1 * | 11/2012 | Trevelyan | H04L 67/10 707/735 |
| 8,356,090 B2 | 1/2013 | Parsons et al. | |

(Continued)

OTHER PUBLICATIONS

Go Daddy Software, Oct. 2, 2002, www.archive.org, at http://web.archive.org/web/20021002232511/www.godaddy.com/gdshop/default.asp?e=com.

(Continued)

*Primary Examiner* — Benjamin M Thieu
(74) *Attorney, Agent, or Firm* — Quarles & Brady LLP

(57) ABSTRACT

Methods and systems of the present invention allow for improving website performance. An exemplary method may comprise the steps of calculating a website quality score for a website (which may indicate the website's effectiveness), identifying changes to the website's attributes that would improve the website's quality score, and modifying the website to include such changes.

15 Claims, 7 Drawing Sheets

(56) References Cited

U.S. PATENT DOCUMENTS

| | | | |
|---|---|---|---|
| 8,498,990 B2 * | 7/2013 | Heber | G06Q 10/00 707/748 |
| 8,676,798 B1 * | 3/2014 | Datta | G06F 17/30864 707/706 |
| 8,713,010 B1 * | 4/2014 | Trevelyan | G06F 17/30864 707/708 |
| 8,849,812 B1 * | 9/2014 | Mukherjee | G06Q 30/02 707/728 |
| 2001/0034646 A1 | 10/2001 | Hoyt et al. | |
| 2002/0143659 A1 | 10/2002 | Keezer et al. | |
| 2002/0194373 A1 | 12/2002 | Choudhry | |
| 2003/0172374 A1 * | 9/2003 | Vinson | G06Q 30/02 725/9 |
| 2003/0187719 A1 * | 10/2003 | Brocklebank | G06Q 10/06 705/14.42 |
| 2003/0208578 A1 | 11/2003 | Taraborelli et al. | |
| 2004/0049587 A1 | 3/2004 | Henaff et al. | |
| 2004/0133440 A1 | 7/2004 | Carolan et al. | |
| 2004/0148229 A1 | 7/2004 | Maxwell | |
| 2004/0168066 A1 | 8/2004 | Alden | |
| 2004/0249978 A1 | 12/2004 | Marappan et al. | |
| 2005/0108325 A1 | 5/2005 | Ponte | |
| 2005/0246627 A1 | 11/2005 | Sayed | |
| 2006/0174199 A1 | 8/2006 | Soltis et al. | |
| 2006/0200751 A1 | 9/2006 | Underwood et al. | |
| 2007/0299682 A1 | 12/2007 | Roth et al. | |
| 2008/0010139 A1 | 1/2008 | Elmer et al. | |
| 2008/0059348 A1 | 3/2008 | Glassman et al. | |
| 2008/0126170 A1 | 5/2008 | Leck et al. | |
| 2008/0307339 A1 | 12/2008 | Boro et al. | |
| 2009/0094379 A1 | 4/2009 | Lu et al. | |
| 2009/0132487 A1 | 5/2009 | Lev | |
| 2009/0235182 A1 | 9/2009 | Kagawa et al. | |
| 2009/0327231 A1 | 12/2009 | Zappa et al. | |
| 2010/0042487 A1 | 2/2010 | Barazani | |
| 2010/0042927 A1 | 2/2010 | Kim | |
| 2010/0138268 A1 | 6/2010 | Guo et al. | |
| 2012/0116834 A1 | 5/2012 | Pope et al. | |
| 2012/0116835 A1 | 5/2012 | Pope et al. | |
| 2012/0284252 A1 * | 11/2012 | Drai | G06F 17/30864 707/709 |
| 2013/0151600 A1 * | 6/2013 | Miller | G06F 11/3688 709/203 |

OTHER PUBLICATIONS

Go Daddy Software: WebSite Complete v 5.0, Dec. 10, 2002, www.archive.org, at http://web.archive.org/web/20021210150241/www.godaddy.com/gdshop/websitecomplete.asp?isc=&se=+&from_app=.

Review of Personalization Technologies: Collaborative Filtering vs. ChoiceStream's Attributized Bayesian Choice Modeling. ChoiceStream. http://www.choicestream.com/pdf/ChoiceStream_TechBrief.pdf. Apr. 2004.

Website Personalization: An Empirical Study of Novice and Expert Users on MyYahoo.com. http://www.doug-info.com/papers/personalization.htm. Fall 2000.

Personalization is Over-Rated. http://www.useit.com/alertbox/981004.html. Oct. 4, 1998.

Novice vs. Expert Users. http://www.useit.com/alertbox/20000206.htm. Feb. 6, 2000.

Intranet Portals: A Tool Metaphor for Corporate Information. http://www.useit.com/alertbox/20030331.html. Mar. 31, 2003.

The personalization story. ITworld.com. http://www.itworld.com/Man/2676/ITW010511rosenberg/pfindex.html. May 11, 2001.

Copyright.gov; www.copyright.gov; Feb. 5, 2001.

Microsoft Computer Dictionary, 5th Edition, 2002, p. 383.

www.GoDaddy.com screen shot, Dec. 6, 2002.

GoDaddy.com screen shot, http://web.archive.org/web/20030401091726/www.godaddy.com/gdshop/default.asp?e=com.

Internet print-out of http://web.archive.org/web/20000901042248/http://www.datex.net/ecommerce/glossary.htm, Internet archive of datex.net, Sep. 1, 2000.

WiredAlumni, Jun. 1, 2000.

* cited by examiner

METHODS AND SYSTEMS FOR IMPROVING WEBSITE PERFORMANCE

FIELD OF THE INVENTION

The present inventions generally relate to website design and hosting and, more specifically, methods and systems for improving website performance.

SUMMARY OF THE INVENTION

An example embodiment of a method for improving website performance may comprise calculating a website quality score for a website (which may indicate the website's effectiveness), identifying changes to the website's attributes that would improve the website's quality score, and modifying the website to include such changes.

An example embodiment of a system for improving website performance may comprise a server computer hosting a website having a URL and an application server computer running a website scoring and improvement module configured to calculate a website quality score for a website (which may indicate the website's effectiveness), identify changes to the website's attributes that would improve the website's quality score, and modify the website to include such changes.

The above features and advantages of the present inventions will be better understood from the following detailed description taken in conjunction with the accompanying drawings.

DETAILED DESCRIPTION

Figure 1:
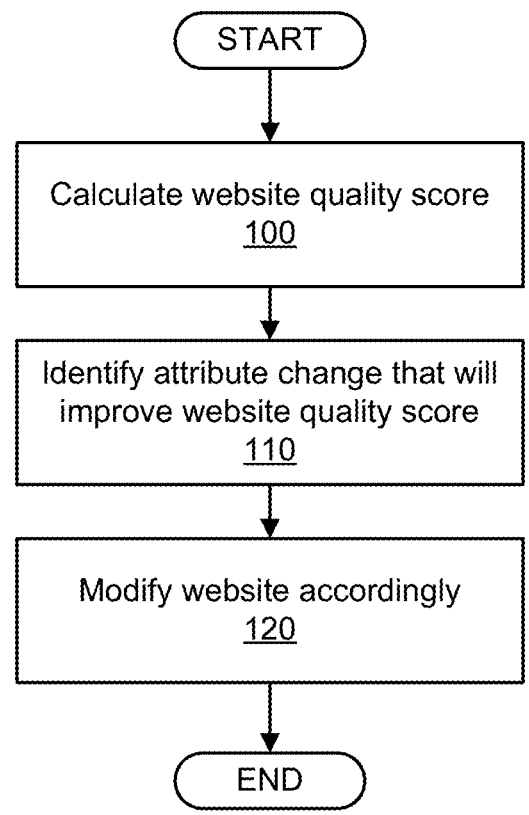
FIG. 1 is a flow diagram illustrating a possible embodiment of a method for improving website performance.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet comprises a vast number of computers and computer networks that are interconnected through communication links arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Menus and links may be used to move between different webpages within the website or to move to a different website as is known in the art. Websites may be created using HyperText Markup Language (HTML) to generate a standard set of tags that define how the webpages for the website are to be displayed. Such websites may comprise a collection of HTML and subordinate documents (i.e., files) stored on the Web that are typically accessible from the same Uniform Resource Locator (URL) and reside on the same server, although such files may be distributed in numerous servers.

Users of the Internet may access content providers' websites using software known as an Internet browser, such as MICROSOFT INTERNET EXPLORER or MOZILLA FIREFOX. A request is made by entering the website's URL in the browser. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain. An example of a URL with a HTTP request and domain is: http://www.companyname.com. In this example, the "http" identifies the URL as a HTTP request and the "companyname.com" is the domain.

Websites, unless extremely large and complex or have unusual traffic demands, typically reside on a single server and are prepared and maintained by a single individual or entity. Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Some websites may be more effective than others. For example, one website may have better data accessibility, aesthetic appeal, mobile performance, sales, traffic, bandwidth, Search Engine Optimization (SEO), or features (e.g., blogs, ads, video, etc.) than others. Applicant has determined that presently-existing systems and methods do not provide optimal means for identifying the attributes of a website that could or should be improved to increase performance, and improving those attributes. For these reasons, there is a need for the methods and systems for improving website performance as described herein.

FIG. 1 illustrates a method of improving website performance that may comprise the steps of calculating a quality score for the website (Step 100), identifying a change to an attribute that may improve the quality score (Step 110), and modifying the website to include the changed attribute (Step 120).

The website quality score may be a function of any of the website's attributes. As non-limiting examples, the attributes may comprise design attributes (e.g., an information accessibility metric indicating how easy it is to locate key pieces of information on the website, an aesthetic metric indicating how appealing the website "looks" to users, perhaps as a function of colors, layout, etc., or a mobile rendering metric indicating how well the website renders on mobile devices). Alternatively, the attributes may comprise performance attributes (e.g., a sales metric indicating how well the website performs financially, a traffic metric indicating how frequently Internet users access the website, a SEO metric, a loading speed metric, a mobile performance metric, or a data transference metric).

The website quality score calculation (Step 100) may be accomplished by software running on an application server operating to compare the website's attributes against predetermined parameters. For example, websites having performance attributes exceeding predetermined values may be given a higher score, while those with lower performance attributes may be given a lower score. Design attributes may be compared against pre-determined templates known to be successful. Websites having design attributes closer to those of the pre-determined templates may be given higher scores. Attributes may be independent of each other or, conversely, dependent on each other. For example, attributes may be positively or negatively correlated (e.g., website quality score improvements resulting from a change to attribute 1 may be doubled if attribute 2 is also changed. Or score improvements resulting from changing attribute 1 are diminished if attribute 2 is changed).

Alternatively, the website quality score calculation (Step 100) may be accomplished by the comparing the website's attributes against with those of other websites. Comparisons may be made between websites hosted with the same or different hosting providers. Where the websites are hosted by different hosting providers, software and/or scripts running on an application server may run tests or otherwise probe the subject website to determine its attributes and compare with other websites.

In another embodiment, all websites may be hosted by the same hosting provider, such as GODADDY. This embodiment may take advantage of the hosting provider's unique position as host to these numerous websites. By hosting many websites, the hosting provider may access data indicating which websites are more effective than others. For example, the hosting provider may identify those websites that process the most transactions, have the most sales, or are otherwise the most financially successful. The hosting provider also may determine those websites that are top performers, perhaps by measuring page load times, SEO ranking, traffic, etc. The attributes of identified high-performing websites then may be identified and compared to those of the subject website. In one embodiment, websites may be separated by vertical (e.g., bike shops, law firms, restaurants, etc.) before the comparison is performed, thus ensuring that the subject website is compared to websites within the same vertical.

A website quality score then may be calculated (Step 100). As a non-limiting example, the website quality score may indicate the website's effectiveness and may be a function of its attributes. The website quality score may comprise a metric representing the effectiveness of the website's design. It may provide a way to quantifiably assess quality of website design, which may be complex due to the multiple factors involved including, but not limited to, the following: ability to find key pieces of information (e.g., price of offered services, "pants" in a clothing catalog), aesthetic appeal (e.g., effectiveness of color used related to desired action), rendering and performance on mobile devices (e.g. does the website display properly on an mobile device), SEO, etc.

The website quality score may comprise any score indicating the effectiveness of the subject website and may comprise any rating or ranking scale known in the art or developed in the future. As non-limiting examples, the website quality score may range from 0 to 1, 1 to 10, 0% to 100%, and/or A+ to F- (e.g., grades). Alternatively, it may comprise a star rating system or a color rating system (e.g., red indicates a poor reputation, yellow indicates an average reputation, and green indicates a good reputation). As one non-limiting example, the range for website quality scores may have a minimum value of 0% and a maximum value of 100%, and may indicate a transition from a negative to a positive score when the score exceeds 50%.

In one embodiment, software running on an application server may calculate a website quality score (Step 100) by sequentially ranking the subject website amongst a plurality of websites according to a particular attribute, such as sales volume, and assign a score according to the website's percentile rank (e.g., a score of 75% if the subject website has higher sales than 75% of other websites). In another embodiment, "grades" may be assigned according to a percentile score (e.g., A for 100-80%, B for 80-60%, C for 60-40%, D for 40-20%, and F for 20-0%).

Attribute changes that may improve the website quality score then may be identified (Step 110). As a non-limiting example, aesthetic changes or website features present in high-scoring websites may be identified that are not present in the subject website. Software running on the application server may, for example, generate a temporary, modified version of the subject website, and re-calculate the website quality score for the temporary website. If the score exceeds the prior score, the subject website may be modified to include the changed attribute that drove the score increase (Step 120) and published to the Internet.

In one embodiment, the illustrated methods may be performed before the website is published or otherwise hosted at a URL. In a non-limiting example, the methods described herein may be performed while the website is being built via a website building software application to optimize the performance of the website prior to publication at a URL. In such a pre-publication embodiment, the website's files may be stored locally (e.g., in a server's memory/filesystem and not yet published at a URL), but may be accessible by an application server performing the described methods.

Figure 2:
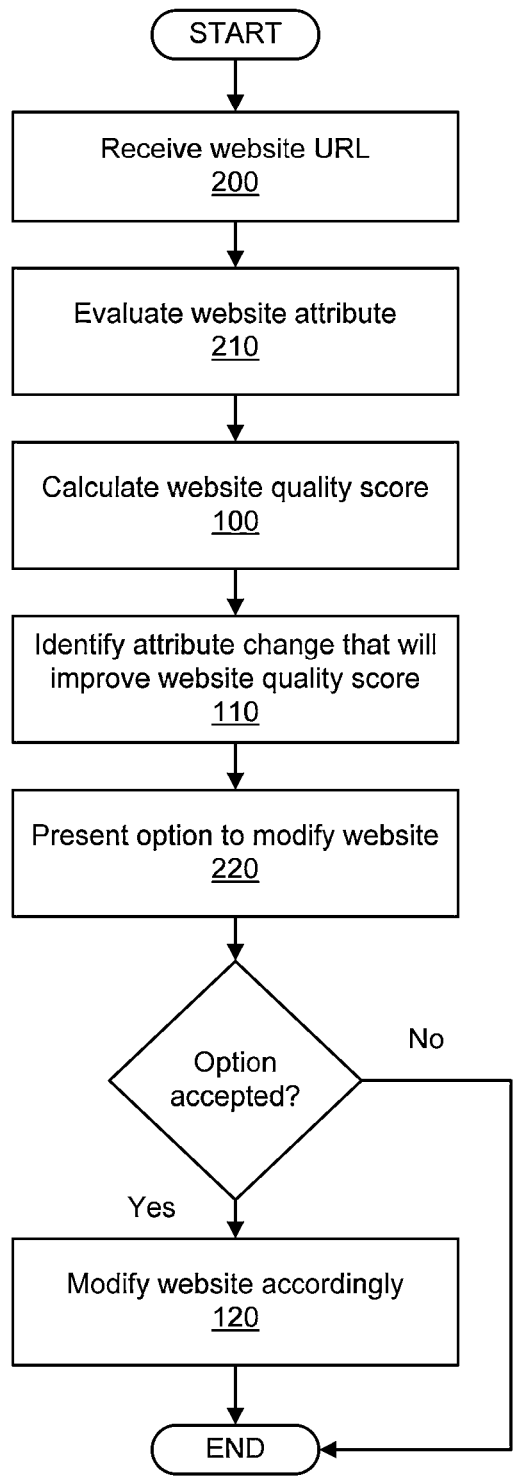
FIG. 2 is a flow diagram illustrating a possible embodiment of a method for improving website performance.

FIG. 2 illustrates an example embodiment that builds upon the method illustrated in FIG. 1. In this illustrated embodiment, the subject website may be identified by receiving a URL resolving to the website (Step 200), and evaluating at least one attribute of the website (Step 210) before the website quality score is calculated (Step 100).

The URL may be received (Step 200), perhaps at an application server performing the described method, by any method of receiving data known in the art or developed in the future including, but not limited to, receiving the URL via electronic communication. The URL may comprise a fully-qualified and functioning domain name propagated through the DNS or, alternatively, may comprise a temporary, internal URL at which the website is temporarily hosted during website development. As a non-limiting example, a control panel website hosted on the application server may be configured (e.g., programmed) to receive a URL (Step 200), perhaps by displaying a virtual button entitled "submit website for review" that, when "clicked" by a user such as a website administrator, transmits a URL entered in a data field via HTTP protocol that is received by the application server. Attributes of the website to which the URL resolves may then be evaluated for effectiveness (Step 210) as described above in relation to website score calculation (Step 100).

The embodiment illustrated in FIG. 2 further enables the subject website's administrator to accept or reject website modifications. In one embodiment, the website administrator may be presented with a list of suggested changes and incremental website quality score improvements that would result from each change, along with options to accept/reject changes in bulk or at the level of granularity of individual changes. If changes are accepted, the website may be modified accordingly (Step 120).

Figure 3:
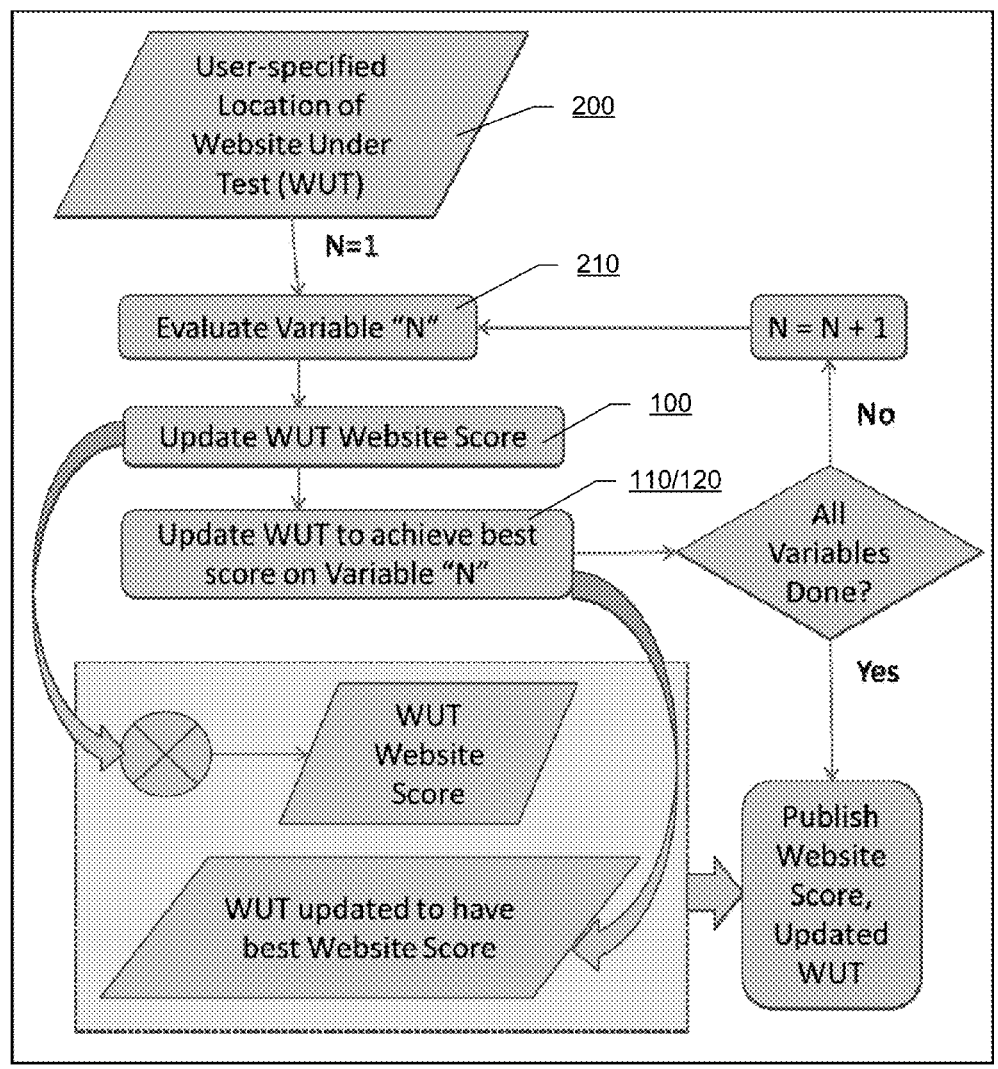
FIG. 3 is a flow diagram illustrating a possible embodiment of a method for improving website performance.

FIG. 3 illustrates an iterative embodiment of a method of improving website performance. In such an embodiment numerous attributes (i.e., "variables") may be evaluated (Step 210), perhaps one-by-one, concurrently, or serially. With each iteration, the website quality score may be calculated (Step 100) and the website updated (Step 120) to maximize the final website quality score, and therefore website performance. In one embodiment, only those incremental attribute changes that result in an improved website quality score may be implemented (Step 120). In another embodiment, combinations of variable bundles could be iterated towards finding the optimal set that results in the best website quality score.

Figure 4:
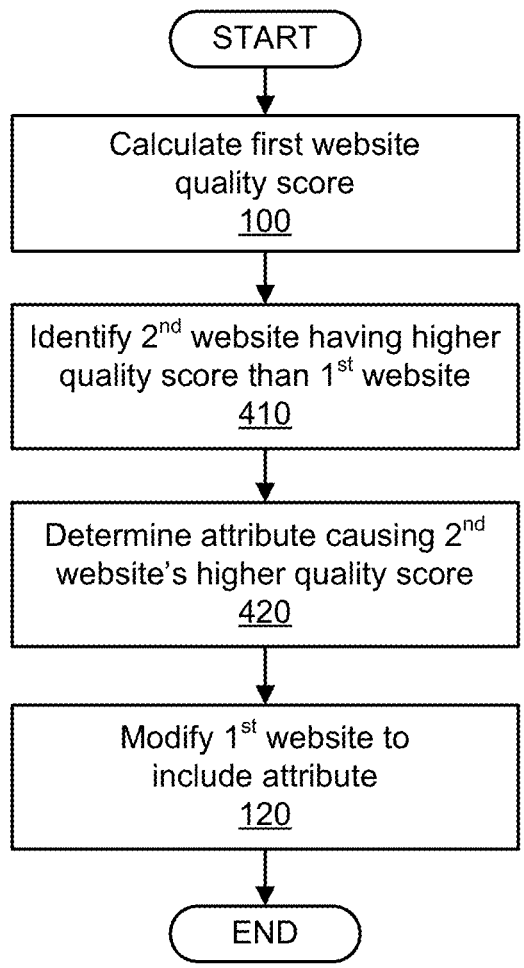
FIG. 4 is a flow diagram illustrating a possible embodiment of a method for improving website performance.

FIG. 4 illustrates a comparative method of improving website performance that may comprise the steps of calculating a first website quality score indicating an effectiveness of a first website (Step 100), identifying a second website having a quality score that is better than the first website's score (Step 410), determining the attributes of the second website causing the better scores (Step 420), and modifying the first website to include at least one attribute of the second website (Step 120).

Higher-scoring websites may be identified (Step 410), perhaps by searching a database storing website templates in association with their quality scores and/or attributes causing such increased quality scores. Alternatively, a plurality of websites may be concurrently scored and compared against each other. Specific website attributes driving higher scores may be determined (Step 420), perhaps by comparing specific performance attributes (e.g., sales, load time, traffic) and concluding that design attributes or features present in the second website and not present in the first website (e.g., a blog or video) drive the second website's improved score. Alternatively, Step 420 may be accomplished by generating temporary duplicate website files and iteratively altering website attributes or features, and calculating the resultant change in quality score. If the score improves, it may be concluded that the changed attribute caused the improvement.

Figure 5:
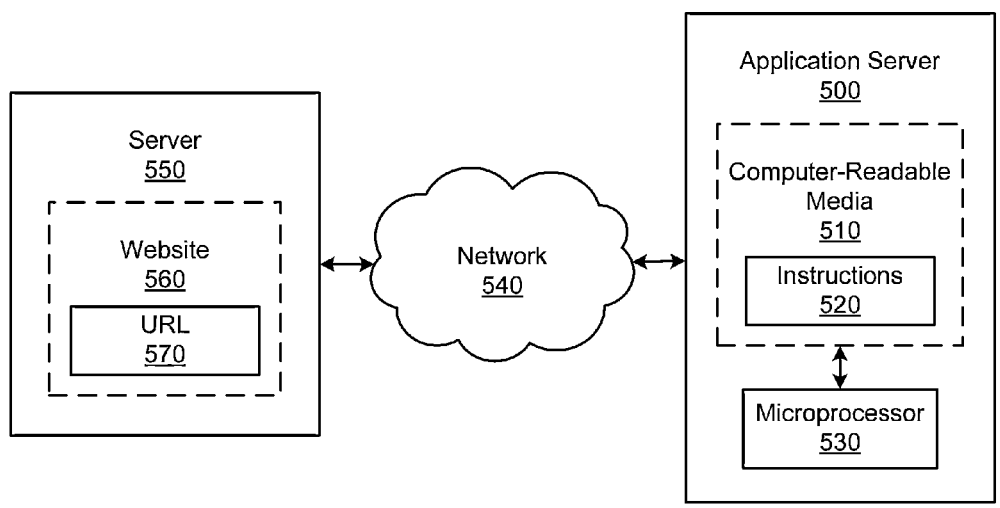
FIG. 5 illustrates a possible embodiment of a system for improving website performance.
Figure 6:
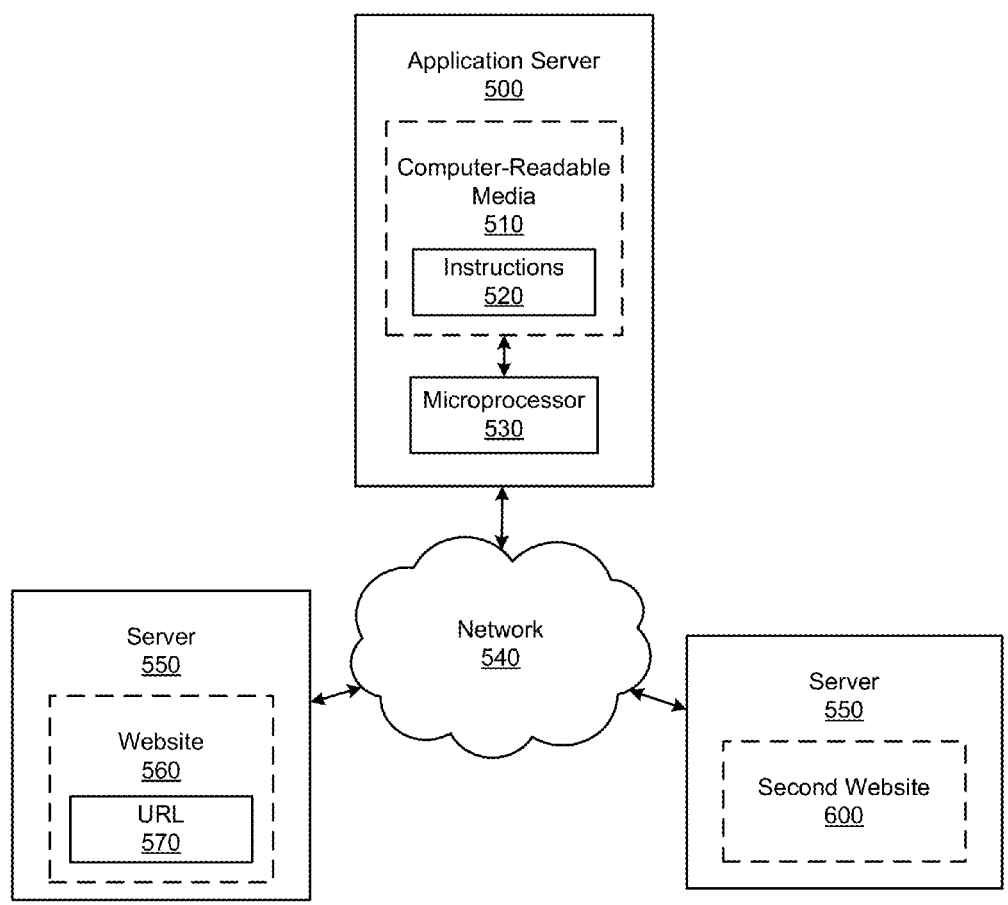
FIG. 6 illustrates a possible embodiment of a system for improving website performance.
Figure 7:
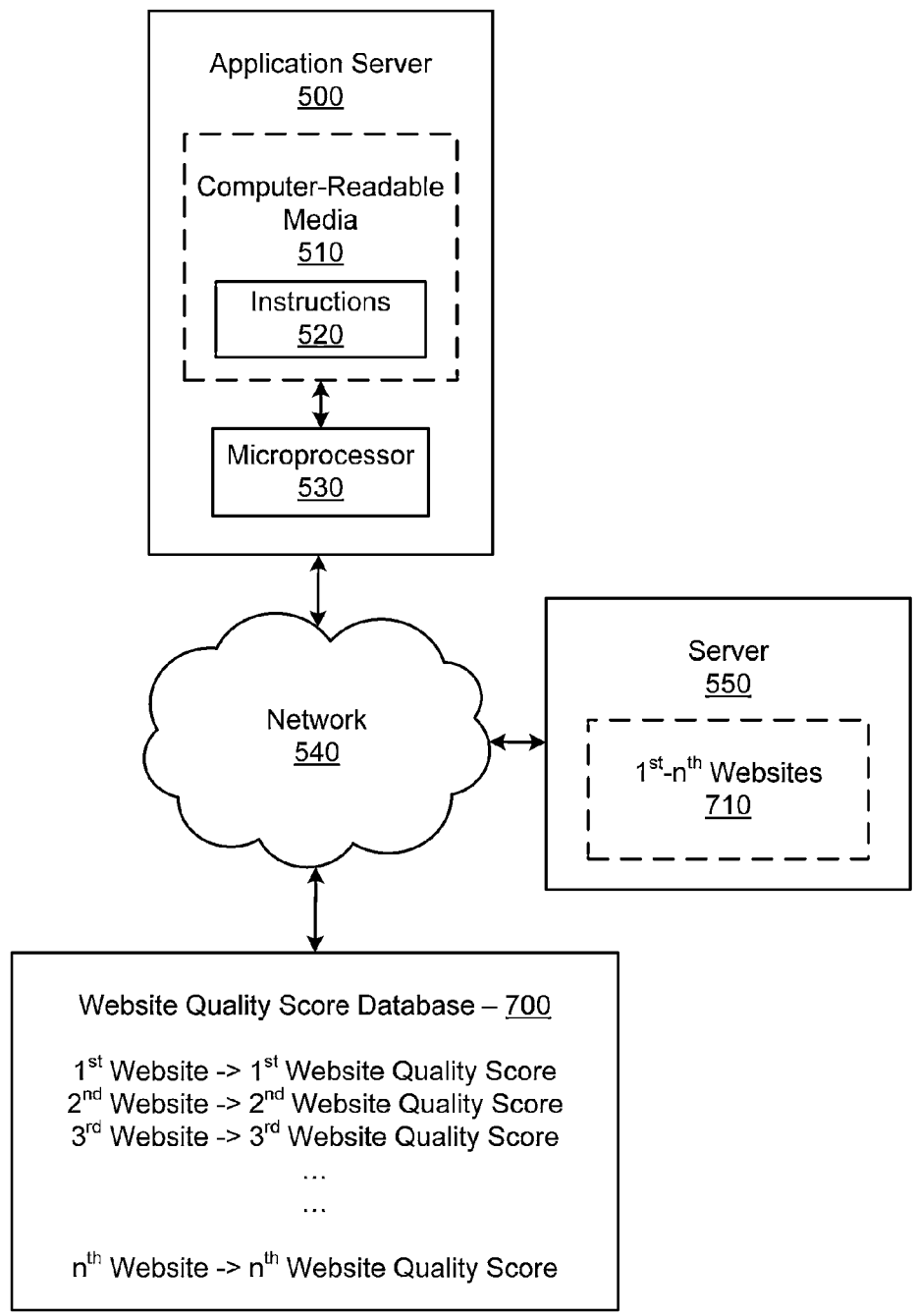
FIG. 7 illustrates a possible embodiment of a system for improving website performance.

FIGS. 5-7 are non-limiting illustrations of systems that may perform the above-described methods. For example, the steps of all methods described in this patent application may be performed by any central processing unit (CPU) in any computing system, such as a microprocessor 530 running on one or more servers 500 and executing instructions 520 stored (perhaps as scripts and/or software) in computer-readable media 510 accessible to the CPU or microprocessor 530, such as a hard disk drive on a server 500, which may be communicatively coupled to a network 540 (e.g., the Internet). Such software and/or scripts may comprise server-side software and/or client-side software.

FIG. 5 illustrates an embodiment of a system for improving website performance that may comprise a server computer 550 communicatively coupled to a network 540 and hosting a website 560 having a URL 570. The system also may comprise an application server computer 500 communicatively coupled to the network 540 and running a website scoring and improvement module (e.g., software based instructions 520 stored in computer-readable media 510) configured to calculate a quality score for the website 560 (Step 100), identify a change to an attribute that may improve the quality score (Step 110), and modify the website 560 to include the changed attribute (Step 120).

The example embodiments illustrated herein place no limitation on network 540 configuration or connectivity. Thus, as non-limiting examples, the network 540 could comprise the Internet, the public switched telephone network, the global Telex network, computer networks (e.g., an intranet, an extranet, a local-area network, or a wide-area network), wired networks, wireless networks, or any combination thereof.

Servers 500 and/or 550 (and/or any other server described herein) may be communicatively coupled to the network 540 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof. As non-limiting examples, the servers could be application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, or any combination thereof).

The website 560 may be hosted by any system or method known in the art or developed in the future for website hosting including, but not limited to, storing the website's 560 files, databases, and/or database tables on a server 550 communicatively coupled to a network 540, perhaps for access by a client running a browser configured to render the website on the client's display. As non-limiting examples, the website 560 may be hosted on the website 560 owner, operator, or administrator's computer or server or, alternatively, by a hosting provider as described in detail above.

The website 560 may comprise any collection of data and/or files accessible to a client or server 500 communicatively coupled to the network 540. As a non-limiting example, the website 560 may comprise a single webpage or multiple interconnected and related webpages resolving from a domain name, each of which may provide access to static, dynamic, multimedia, or any other content, perhaps by accessing files (e.g., text, audio, video, graphics, executable, HTML, eXtensible Markup Language (XML), Active Server Pages (ASP), Hypertext Preprocessor (PHP), Flash files, server-side scripting, etc.) that enable the website 560 to display when rendered by a browser on a client.

FIG. 6 illustrates an alternate embodiment of a system for improving website performance that, in addition to the elements identified in FIG. 5, also may include a server 550 hosting a second website 600. In such an embodiment, the application server 500 further may be configured to calculate a first website quality score indicating an effectiveness of a first website 560 (Step 100), identify a second website 600 having a quality score that is better than the first website's 560 score (Step 410), determining the attributes of the second website 600 causing the better scores (Step 420), and modifying the first website 560 to include at least one attribute of the second website 600 (Step 430).

FIG. 7 illustrates an alternate embodiment of a system for improving website performance wherein multiple website 710 are hosted by the same hosting provider. In such an embodiment, an application server 500 may be configured to score multiple websites 710 (Step 100) and store their quality scores in a database 700. The database 700 may then be accessed by the system to identify successful website attributes (Step 110) and/or determine websites having higher quality scores that the subject website (Step 420).

The above-described methods (or any step of such methods) also may be performed by an application programming interface (API) running on at least one server 500 or 550 communicatively coupled to a network 540. The API may comprise computer-readable code that, when executed by at least one server 500 or 550, causes the API to perform each method step. The API may comprise a software-to-software interface that specifies the protocol defining how independent computer programs interact or communicate with each other. As a non-limiting example, the API may perform each method step through a series of function calls (requests for services). The API may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

The methods and systems may be used in many ways to improve website performance. In one example use, a website 560 administrator may have concerns that the website 560 is underperforming. Perhaps monthly sales for his online bicycle shop are perceived as too low compared to other bike shops, and he wants to improve revenue. Using a browser running on a personal computer, smartphone, or tablet, the website 560 administrator may navigate to a control panel provided by his website's 560 hosting provider and enter the URL 570 for his website 560 in a data field, and click "submit." The browser may transmit the URL 570, perhaps via HTTP protocol, to an application server 500, perhaps operated by the website's 560 hosting service provider, where the URL 570 is received (Step 200).

The application server 500 then may access data available to the hosting service provider as host of the website 560, such as traffic volume, monthly sales, and SEO ranking, and calculate a website quality score based upon these attributes (Step 100), perhaps by averaging the performance of the website's 560 attributes and comparing performance against a plurality of other websites 710 hosted on the same hosting service 550. For purposes of this example, if the website's 560 average performance exceeds 50% of other hosted websites 710, the website 560 may be assigned a score of 50%.

The application server 500 then may determine that the website 560 is in the "bike shop" vertical, perhaps by parsing content (e.g., key words and images) and determining to a predetermined probability that the website 560 belongs to the "bike shop" vertical. Alternatively, the website 560 administrator may have selected the appropriate vertical from a menu on the control panel.

The application server 500 then may search a website quality score database 700 storing, according to vertical, websites in association with their quality scores. In the illustrated example, therefore, the application server 500 would search for and identify other bike shop websites having quality scores higher than 50% (Step 410).

The application server 500 then may determine the attributes of the higher-scoring websites causing the better quality scores (Step 420), perhaps by comparing specific performance attributes (e.g., sales, load time, traffic) and concluding that design attributes or features (e.g., a blog or video) present in the higher-performing websites are not present in the subject website 560.

The application server 500 then may present the website 560 administrator with options for improving website 560 performance, perhaps via the previously-described control panel (Step 220). For example, he may be presented with the option (perhaps via a check box) to add a blog, along with an indication that adding the proposed attribute would increase the website's 560 quality score to 60%. If the website 560 administrator accepts the suggested change, the application server 500 may modify the website 560 (Step 120) by installing a blog.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A method, comprising:
evaluating, by at least one server computer, at least one attribute of a website, wherein said at least one attribute comprises a design attribute;
determining a plurality of website templates known to be successful;
comparing the design attribute against the plurality of website templates known to be successful;
calculating for the website, by said at least one server computer, a website quality score indicating an effectiveness of said website compared to a plurality of websites within a vertical, wherein said website quality score is a function of said design attribute;
identifying, by said at least one server computer, a change to said design attribute of said website that will improve said website quality score;
presenting, by said at least one server computer, the administrator of said website an option to modify said website to include said change to said design attribute; and
modifying, by said at least one server computer, said website to include said change.

2. The method of claim 1, wherein said design attribute comprises an information accessibility metric, an aesthetic metric, or a mobile rendering metric.

3. The method of claim 1, wherein said at least one attribute comprises a performance attribute.

4. The method of claim 3, wherein said performance attribute comprises a sales metric, a traffic metric, a SEQ metric, a loading speed metric, a mobile performance metric, or a data transference metric.

5. A method, comprising:
evaluating, by at least one server computer, at least one attribute of a first website, wherein said at least one attribute comprises a design attribute;
determining a plurality of website templates known to be successful;
comparing the design attribute against the plurality of website templates known to be successful;
calculating for the first website, by said at least one server computer, a first website quality score indicating an effectiveness of said first website compared to a plurality of websites within a vertical, wherein said first website quality score is a function of said design attribute of said first website;
identifying, by said at least one server computer, a second website having a second website quality score indicating an effectiveness of said second website compared to the plurality of websites within the vertical, wherein said second website quality score exceeds said first website quality score;
determining, by said at least one server computer, at least one attribute of said second website causing said second website quality score to exceed said first website quality score; and
modifying, by said at least one server computer, said first website to include said at least one attribute of said second website.

6. The method of claim 5, wherein said design attribute comprises an information accessibility metric, an aesthetic metric, or a mobile rendering metric.

7. The method of claim 5, wherein said at least one attribute of said first website or said at least one attribute of said second website comprises a performance attribute.

8. The method of claim 7, wherein said performance attribute comprises a sales metric, a traffic metric, a SEQ metric, a loading speed metric, a mobile performance metric, or a data transference metric.

9. The method of claim 5, wherein said first website and said second website are hosted by a common hosting provider.

10. A system, comprising:
a server computer communicatively coupled to a network and hosting a website;
an application server computer communicatively coupled to said network and running a website scoring and improvement module configured to:
evaluate at least one attribute of the website, wherein said at least one attribute comprises a design attribute;
determining a plurality of website templates known to be successful;
comparing the design attribute against the plurality of website templates known to be successful;
calculate a website quality score for said website, said website quality score indicating an effectiveness of said website compared to a plurality of websites within a vertical, wherein said website quality score is a function of said at least one attribute;
identify a change to at least one attribute that will improve said website quality score; and
modify said website to include said change.

11. The system of claim 10, wherein said design attribute comprises an information accessibility metric, an aesthetic metric, or a mobile rendering metric.

12. The system of claim 10, wherein said at least one attribute comprises a performance attribute.

13. The system of claim 12, wherein said performance attribute comprises a sales metric, a traffic metric, a SEQ metric, a loading speed metric, a mobile performance metric, or a data transference metric.

14. The system of claim 10, wherein said application computer if further configured to present an administrator of said website an option to modify said website to include said change to said at least one attribute.

15. The system of claim 10, wherein said application server computer is further configured to identify said change to said at least one attribute that will improve said website quality score by:
identifying a second website having a second website quality score indicating an effectiveness of said second website, wherein said second quality score exceeds said website quality score; and
determining at least one attribute of said second website causing said second website quality score to exceed said first website quality score.

* * * * *